US010041468B2

(12) United States Patent
Lai

(10) Patent No.: US 10,041,468 B2
(45) Date of Patent: Aug. 7, 2018

(54) LOW-HEAD AND HIGH FLOW WATER TURBINE MACHINE

(71) Applicant: Jung-Yi Lai, Keelung (TW)

(72) Inventor: Jung-Yi Lai, Keelung (TW)

(*) Notice: Subject to any disclaimer, the term of this patent is extended or adjusted under 35 U.S.C. 154(b) by 0 days.

(21) Appl. No.: 15/654,561

(22) Filed: Jul. 19, 2017

(65) Prior Publication Data
US 2018/0023540 A1    Jan. 25, 2018

(30) Foreign Application Priority Data

Jul. 21, 2016  (TW) .............................. 105123053 A

(51) Int. Cl.
F03B 13/00      (2006.01)
H02P 9/04       (2006.01)
F03B 17/06      (2006.01)
F03B 13/10      (2006.01)
F03D 9/00       (2016.01)
F03B 13/08      (2006.01)

(52) U.S. Cl.
CPC ............ F03B 17/063 (2013.01); F03B 13/10 (2013.01); F03B 13/08 (2013.01); F05B 2210/11 (2013.01); F05B 2240/301 (2013.01); F05B 2250/231 (2013.01)

(58) Field of Classification Search
USPC ...................... 290/44, 54, 55; 415/53.1, 53.3
See application file for complete search history.

(56) References Cited

U.S. PATENT DOCUMENTS 1,436,933 A    11/1922  Banki et al.
1,484,980 A     2/1924  Zottoli
2,914,243 A *  11/1959  Eck .................... F04D 17/04
                                              415/53.2
(Continued)

FOREIGN PATENT DOCUMENTS

JP          5-18344 A    1/1993
JP      P2014-15923 A    1/2014
(Continued)

OTHER PUBLICATIONS

Formality Examination Report issued by Intellectual Property Office of the Philippines Bureau of Patents dated Oct. 13, 2017.

Primary Examiner — Pedro J Cuevas
(74) Attorney, Agent, or Firm — Chun-Ming Shih

(57) ABSTRACT

A low-head and high flow water turbine machine comprises a water-guiding base having a top plate, a bottom plate, an accommodating space defined therein, an inlet and an outlet respectively arranged at upstream side and downstream side, and a first and a second lateral plates respectively having a first and a second water-guiding walls that are respectively extending inward toward circumference of the accommodating space, a water turbine arranged in the accommodating space and having multiple blades, and a cylindrical-shaped gate shell passing through the top plate and slidably coupled to circumference of water turbine around upstream side wherein an opening degree is adjusted through sliding the gate shell for adjusting cross-sectional area of stream thereby controlling stream discharge entering to the water turbine, switching off rotation of the water turbine, and adjusting water level at high water level state at upstream side according to the stream discharge requirement.

14 Claims, 12 Drawing Sheets

(56) References Cited

U.S. PATENT DOCUMENTS

| | | | | |
|---|---|---|---|---|
| 2,942,773 A * | 6/1960 | Eck | | F04D 17/04 415/224 |
| 2,968,436 A * | 1/1961 | Coester | | F04D 17/04 415/53.1 |
| 3,033,441 A * | 5/1962 | Coester | | F04D 17/04 415/53.1 |
| 3,116,011 A * | 12/1963 | Laing | | F04D 17/04 415/126 |
| 3,288,355 A * | 11/1966 | Laing | | F04D 17/04 415/145 |
| 3,295,750 A * | 1/1967 | Laing | | F04D 17/04 415/53.1 |
| 4,551,631 A * | 11/1985 | Trigilio | | F03D 3/0409 290/55 |
| 4,579,506 A | 4/1986 | Ossberger et al. | | |
| 4,836,743 A * | 6/1989 | Guezou | | F04D 17/04 415/53.1 |
| 6,261,051 B1 * | 7/2001 | Kolacny | | F01D 1/14 415/224 |
| 6,309,179 B1 * | 10/2001 | Holden | | F03B 1/04 290/54 |
| 6,448,669 B1 * | 9/2002 | Elder | | F03D 3/0409 290/54 |
| 6,465,899 B2 * | 10/2002 | Roberts | | F03D 3/0409 290/44 |
| 6,740,989 B2 * | 5/2004 | Rowe | | F03D 3/0409 290/55 |
| 6,984,899 B1 * | 1/2006 | Rice | | F03D 3/049 290/44 |
| 7,242,108 B1 * | 7/2007 | Dablo | | F03D 3/0472 290/55 |
| 7,503,744 B1 * | 3/2009 | Broome | | F03B 1/00 415/151 |
| 7,633,177 B2 * | 12/2009 | Platt | | F03D 3/0472 290/54 |
| 7,847,428 B2 * | 12/2010 | Platt | | F03D 3/0472 290/54 |
| 8,157,520 B2 * | 4/2012 | Kolacny | | F04D 17/04 180/117 |
| 8,232,664 B2 * | 7/2012 | Stroup | | F03D 3/0418 290/55 |
| 8,579,573 B2 * | 11/2013 | Kolacny | | F04D 17/04 180/117 |
| D704,136 S * | 5/2014 | Rubio | | D13/115 |
| 9,121,384 B2 * | 9/2015 | Lin | | F03D 3/005 |
| 9,249,807 B2 * | 2/2016 | Roter | | F03B 17/061 |
| 2009/0097960 A1 * | 4/2009 | Williams | | F03D 3/06 415/4.2 |
| 2009/0167027 A1 * | 7/2009 | Kato | | F03D 3/02 290/55 |
| 2010/0045039 A1 * | 2/2010 | Stroup | | F03D 3/0418 290/44 |
| 2013/0195623 A1 | 8/2013 | Chung et al. | | |
| 2013/0334825 A1 * | 12/2013 | Roter | | F03B 17/061 290/55 |

FOREIGN PATENT DOCUMENTS

| | | |
|---|---|---|
| PH | 12012500539 B1 | 2/2013 |
| TW | 201221761 A1 | 6/2012 |
| TW | 20130989 A1 | 3/2013 |
| TW | 1472679 B | 2/2015 |
| TW | M534246 U | 12/2016 |

\* cited by examiner

LOW-HEAD AND HIGH FLOW WATER TURBINE MACHINE

This application claims the benefit of Taiwan Patent Application Serial No. 105123053, filed on Jul. 21, 2016 the subject matter of which is incorporated herein by reference.

BACKGROUND OF INVENTION

1. Field of the Invention

The present invention is related to a structure of vertical-axis water turbine machine with characteristics of low-head, high-flow, highly efficient operation to variation of stream discharge, and more particularly, to a low-head and high flow water turbine machine with simplified structure, easy installation and operation so that it can be installed directly in the river or canal for generating power.

2. Description of the Prior Art

The water turbine machine is equipment in hydroelectric plant that is utilized to convert potential energy of water stream into kinetic energy and then the kinetic energy is converted into mechanical energy. Conventionally, in the medium head or high head hydroelectric plant, the water is impounded through dam across the river, and is then guided to impact water turbine of water turbine machine in the plant through water penstock whereby the water turbine is rotated to drive power generator for generating electric power. This is the operation of conventional penstock type water turbine machine where the Pelton turbine and the Francis turbine are the mainly exemplary. Although the efficiency of the above-mentioned penstock type water turbine can reach 0.8~0.93, it is not suitable for directly installing in the river or canal because the civil structure of dam facility, water-guiding penstock, and plant facility are necessary such that the cost of construction will be increased. On the other hand, under condition of low-head with high flow, if the conventional penstock water turbine machine is adapted, the dimension will be quite large. Accordingly, the conventional penstock water turbine machine operated under low-head with high flow is quite rare in the commercial market. Even if it can be customized, the cost will be very expansive; therefore it is hardly to find examples of plant construction as well as examples successfully released in the commercial market.

Generally speaking, conventional penstock water turbine machine utilized with a head between 5 meter to 40 meter such as a Tubular type water turbine machine, Bulb type water turbine machine, and Kaplan water turbine machine, for example, almost need penstock for leading water to the water turbine machine arranged outside the canal or river. Under the condition of low head smaller than 5 meter with high flow, the water turbine machine is not suitable for being arranged directly in the river or canal, practically.

Recently, there has some examples of water turbine machine that are not still successfully released in the commercial market can be applied under low-head condition, and be arranged directly in the river and canal. Although some of those water turbine machines coming from the imitation and improvement of conventional penstock water turbine machine with higher flow resistance have higher operation efficiency, such kind of water turbine machine can only be operated under small flow. Therefore, when it comes to condition of low-head and high flow, such kind of water turbine machine can't satisfy the flow requirement, so it is necessary to expand the canal for setting multiple water turbine machines. Nevertheless, there still has a problem of overflow that induce the stream flow can not be effectively utilized. Even if the water turbine machine is customized to enlarge the dimension, the cost is expansive and not affordable, and some of those water turbine machines that can be operated under low-head and high flow condition without friction loss have lower operation efficiency, e.g., 0.1~0.4. In addition to the high cost as well as low power generation, the water turbine machines also have limitation of arrangement condition, so it is necessary to consider the operation and arrangement conditions when taking the water turbine machine into account. Accordingly, there still has much room for improvement in the operation efficiency and structure of the conventional water turbine machine.

There is another type called inward-flow water turbine machine that can be operated under low-head condition with slightly larger water flow. Unlike the most radial or axial type of water turbine machine but being a derivative type of waterwheel instead, the water stream directly passes through the blades of turbine, i.e. water stream flowing into the turbine at a small angle in the tangential direction from a lateral side of the water turbine, and flowing out of the turbine from gap between blades at opposite side of water turbine. In addition to the impact force when the water stream flows into the turbine, the secondary impact force on the turbine will be generated while the water stream flows out of the turbine. The inward-flow water turbine is designed by Dr. Banki Donat, USA, and is patented as U.S. Pat. No. 1,436,933 in 1919. After that, other competitor improved the original design and patented as U.S. Pat. No. 4,579,506, and then a cross-flow type of water turbine machine was developed and was successfully released to the commercial market. The inward-flow water turbine machine belongs to conventional low-head and penstock type water turbine machine, which is not appropriate to be arranged directly into the river or canal. However, since the cross-flow type water turbine machine has horizontal shaft design and range of water inlet of the water turbine is not large, slightly smaller water stream is allowed to flow into the water turbine so that the water turbine is partially contacted with the air thereby easily obtaining higher efficiency, for example, 0.85~0.75 for the commercial product.

On the other hand, regarding the operation of the vertical axis type of water turbine machine in the river or canal, although the efficiency will also be reduced when the water turbine is immersed under the water, since the power generator can be arranged over the water surface and merits such as simplified structure design, easy installation, convenient maintenance, and no need to setup penstock and plant are possessed, the cost of construction can be saved. Since operation efficiency and installation cost is obtained to make the vertical axis type of water turbine machine become economic, the related research and utilization in the river and canal are gradually increased.

In order to make the vertical axis type of water turbine machine be suitably installed in the river and canal, a technique such as Taiwan Patent No. I472679, entitled, Hydroelectric Generator Device, is provided, where the technique is capable of adjusting a water level at the upstream side and supplying a stable power generation amount with easy maintenance. The hydraulic power generating apparatus includes a water collecting plate which collects water into a water inflow opening while intercepting and accumulating water flowing through a waterway, and a movable gate which is capable of changing flow cross-sectional area of water flow acting to the top ends of rotor blades of a vertical axis turbine as inflowing from the water inflow opening. Here, owing to changing of flow cross-sectional area with opening and closing of the movable gate, a flow rate can be adjusted by changing a water level at the upstream side and opening area of an orifice hole and operation of the rotor blades can be stopped by blocking water passing toward the vertical axis turbine. However, when the device is operated, it still has drawbacks. In addition, when the cross-sectional area of the water stream is adjusted, the rotation speed is not stable in response to the different stream discharge. The is because the technique of the patent is only utilized to adjust the water amount impacting the water turbine through opening and closing of the movable gate rather than control flowing angel of water stream entering the water turbine. Therefore, when the movable gate is completely closed, the water stream from the upstream side cannot enter the water turbine and when the movable gate is opened, the water stream is allowed to pass through the gap between two adjacent blades. Since the average flowing angle that the water stream entering the water turbine will be different with respect to different stream discharge corresponding to various opening degree of the movable gate, the rotation speed and power output will be unstably varied such that it is necessary to rely on other control equipment for making the rotation speed and power output stable. From the above-mentioned description, there still has room of improvement.

Accordingly, there has a need for developing low-head and high flow water turbine machine for solving the problem arising from the conventional arts.

SUMMARY OF THE INVENTION

The primary objective of the present invention is to provide an economic water turbine for hydropower generation having characteristics of simplified structure design, easy adjustment for fitting with the environment, and easy installation and operation so that it can be directly installed in the river, weir, canal, and tide place having low-head and high flow condition for performing hydroelectric generation.

Another objective in the present invention is to provide a water turbine structure that can keep the water level at high state according to the stream discharge on upstream side so as to maintain stable and high operation efficiency under different stream discharge condition.

In order to achieve the above-mentioned objectives, the present invention provides a low-head and high flow water turbine machine comprising a water-guiding base, a water turbine disposed in the water-guiding base, and a cylindrical-shaped gate shell movably inserted in the water-guiding base for controlling stream flow. The water-guiding base further comprises a top plate, a bottom plate, a hollow cylindrical-shaped accommodating space between the top and the bottom plates, a first and a second lateral plates respectively coupled to two opposite sides of the top and bottom plates. The first and the second lateral plates respectively have a first and a second water-guiding walls, each of which has a tapered tower shape. The first and second water-guiding walls are respectively protruded from the first and the second lateral plates to a circumference of the accommodating space, and respectively have a first and a second guiding slots that are respectively arranged at an end of the first and the second water-guiding walls, wherein the first and the second water-guiding walls are respectively arranged anti-symmetrically to a central axis of the accommodating space. In addition, taking the accommodating space as a central part, the accommodating space has an upstream segment with an inlet at an upstream side and a downstream segment with an outlet at a downstream side. The water turbine further comprises a rotating shaft and a plurality of blades, wherein two ends of the rotating shaft respectively coupled to the bottom plate and top plate through bearing unit. The gate shell formed as cylindrical shape is capable of passing through the top plate of the water-guiding base and slidably coupled to a circumference of the water turbine at the upstream side, wherein the two lateral sides of the gate shell respectively slidably coupled to the first and the second guiding slots formed on ends of the first and second water-guiding walls.

In one embodiment of the present invention, the top plate is separable or partially separable from the first and the second lateral plate so as to facilitate installing the water turbine, and an arc slot is formed on the top plate for allowing the gate shell sliding and passing therethrough.

In one embodiment of the present invention, the upstream segment further comprises at least one upstream flow-dividing plate having an discharging arc plate extending toward the circumference of the accommodating space and the downstream segment further comprises at least one downstream flow-dividing plate having a connecting arc plate extending from the circumference of the accommodating space toward the outlet.

In one embodiment of the present invention, the top and bottom plates respectively have a axle hole and a bearing corresponding to the center of the accommodating space, and the two shaft ends of water turbine respectively pass through the axle hole so that the bearing corresponding to each axle hole can be utilized to couple the corresponding shaft end of the water turbine to the top and bottom plates.

In one embodiment of the present invention, wherein each end of the first and second water-guiding walls respectively has a guiding slot, the two lateral sides of the gate shell respectively has a slide bar correspondingly and slidably coupled to the guiding slots, and a reinforcing bar is arranged at adjacent location between the gate shell and the end of discharging arc plate of the upstream flow-dividing plate, whereby positioning capability and supporting force that the discharging arc plate acting on the gate shell can be enforced.

In one embodiment of the present invention, the gate shell is further coupled to a driving mechanism that is utilized to drive the gate shell to generate a reciprocating movement.

In one embodiment of the present invention, at least one separating plate is arranged between the top plate and the bottom plate of the water-guiding base, and each separating plate further comprises a circular hole corresponding to the accommodating space for allowing the water turbine and gate shell passing therethrough, wherein the water turbine further comprises a first plate, and a second plate, and the plurality of blades are circumferentially arranged between the first plate and the second plate, wherein at least one dividing plate is arranged between the first plate and the second plate.

In one embodiment of the present invention, a through hole is formed on the dividing plate thereby allowing water to pass through the dividing plate and flowing in dividing space defined by the first plate, the second plate and at least one dividing plate.

In one embodiment of the present invention, the second plate further comprises at least one drain opening, and an discharging room is arranged under a bottom side of the water-guiding base so that water entering the water turbine flows downward to the discharging room through the at least one drain opening, and is exhausted from the outlet.

In one embodiment of the present invention, the water turbine is a vertical-axis type water turbine.

All these objects achieved by oven apparatus according to the present invention are described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
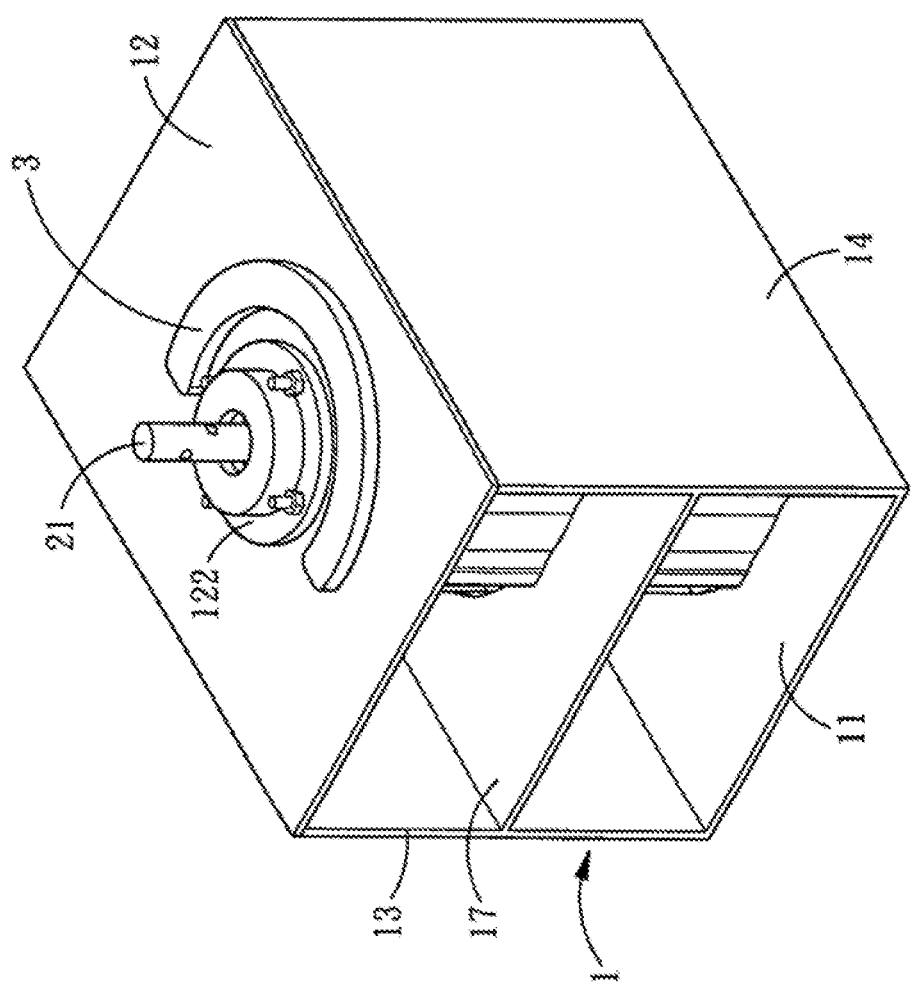
FIG. 1 illustrates a perspective view of water turbine machine according to one embodiment of the present invention.

The invention disclosed herein is directed to a low-head and high flow water turbine machine. In the following description, numerous details corresponding to the aforesaid drawings are set forth in order to provide a thorough understanding of the present invention so that the present invention can be appreciated by one skilled in the art, wherein like numerals refer to the same or the like parts throughout.

Although the terms first, second, etc. may be used herein to describe various elements, components, modules, and/or zones, these elements, components, modules, and/or zones should not be limited by these terms. Various embodiments will now be described in conjunction with a number of schematic illustrations. Various embodiments of the application may be embodied in many different forms and should not be construed as a limitation to the embodiments set forth herein.

For clearly understanding the present invention, please refer to the following description as well as FIGS. 1-6. The present invention comprises a water-guiding base 1, a water turbine 2, and a gate shell 3.

The water-guiding base 1 has an accommodating space 18 for accommodating the water turbine 2. An upstream side of the accommodating space 18 has an upstream segment 15 while a downstream side of the accommodating space 18 has a downstream segment 16. The outermost opening of the upstream segment 15 and the downstream segment 16 respectively has an inlet 15a and outlet 16a.

The top side and bottom side of water-guiding base 1 comprises a bottom plate 11 and a top plate 12, wherein the top plate 12 is separable or partially separable for conveniently installing the water turbine 2 into the accommodating space 18. The top plate 12 and bottom plate 11 respectively comprise an axle hole 111 and 121. A bearing 112 is removably coupled to the axle hole 111 while a bearing 122 is removably coupled to the axle hole 121 so that the water turbine 2 can be installed therewith. The top plate 12 further comprises an arc slot 123 allowing the gate shell 3 slidably passes therethrough.

The two sides of the water-guiding base 1 respectively have a first lateral plate 13 and a second lateral plate 14 that respectively have a first and a second water-guiding walls 131 and 141 with a tapered tower shape. The first and second water-guiding walls 131 and 141 are respectively protruded from the first and the second lateral plate 13 and 14 toward a circumference of the accommodating space 18. One end of each first and second lateral plate 13 and 14 respectively has guiding slot 132 and 142 through which the gate shell 3 can slide thereon.

In addition, the upstream segment 15 of water-guiding base 1 further comprises at least one upstream flow-dividing plate 151. Along direction toward the accommodating space 18, the upstream flow-dividing plate 151 further has a discharging arc plate 152 extending to the outer circumference of accommodating space 18.

The water turbine 2 is arranged in the accommodating space 18 of water-guiding base 1 and comprises a rotating shaft 21 and a plurality of blades 22. Two ends of the rotating shaft 21 respectively coupled to the bottom plate 11 and top plate 12 through bearing 112 and 122, that is, the two ends of the rotating shaft 21 of water turbine 2 respectively passing through the axle holes 111 and 121 so that the bearing 112 and 122 can respectively couple the two ends of the rotating shaft 21 to the corresponding bottom plate 11 and top plate 12.

In the present embodiment, the gate shell 3 is a cylindrical shape and is movably inserted into the top plate 12 of water-guiding base 1, that is, the gate shell 3 is inserted to pass through the arc slot 123 of the top plate 12. Two lateral sides of the gate shell 3 respectively have slide bars 31. The two slide bars 31 are respectively coupled to the guiding slots 132 and 142 that are respectively formed on the end of the first and second water-guiding walls 131 and 141. Meanwhile, the gate shell 3 is further coupled to a driving mechanism that is utilized to drive the gate shell 3 to generate a reciprocating movement. The driving mechanism can be manual transmission mechanism or mechanical power transmission mechanism.

It is noted that at least one separating plate 17 can be arranged between the top plate 12 and bottom plate 11 according to consideration of different practical conditions such as installation place, water volume, and water depth, for example. The separating plate 17 further has a circular hole 171 located corresponding to the accommodating space 18 for allowing the water turbine 2 and gate shell 3 passing therethrough. The water turbine 2 further comprises a first plate 23 and second plate 24, and the plurality of blades 22 are arranged between the first plate 23 and the second plate 24. In addition, at least one dividing plate 25 is arranged between the first plate 23 and second plate 24. A through hole is further formed on the dividing plate 25 thereby allowing water flowing into the water turbine 2 can flowingly communicate between each layer space divided by the dividing plate 25.

In the following description, the definition of the term with respect to the present invention is explained for better understanding the embodiment shown in the present invention. The term upstream flow path 15b refers to a flowing space defined from the inlet 15a to the upstream circumference of accommodating space 18, that is, the flowing space in the upstream segment 15 of water-guiding base 1 formed by upstream segment of bottom plate 11, upstream segment of top plate 12, upstream segment of the first lateral plate 13, upstream segment of the first water-guiding wall 131, upstream segment of the second lateral wall 14, upstream segment of the second water-guiding wall 141, upstream flow-dividing plate 151, and discharging arc plate 152. The term downstream flow path 16b refers to a flowing space defined from the downstream circumference of accommodating space 18 to the outlet 16a, that is, the flowing space in the downstream segment 16 of water-guiding base 1 formed by downstream segment of bottom plate 11, downstream segment of top plate 12, downstream segment of the first lateral plate 13, downstream segment of the first water-guiding wall 131, downstream segment of the second lateral wall 14, and downstream segment of the second water-guiding wall 141. The term discharging opening 15c refers to a narrowest area where the upstream flow path 15b is close to the water turbine 2 wherein the width of the discharging opening 15c is apparently smaller than the upstream flow path 15b.

When the embodiment of the present invention is practiced, a water-blocking plate 4 and a lifting plate 41 is arranged at the upstream side of the water-guiding base 1 for blocking a cross-sectional area of the stream channel, e.g., rivers or canal, and, in response to close the gate shell 3, the water stream flow can be blocked at upstream side so as to form a reservoir with high water level. The opening degree of the gate shell 3 is adjusted according to the stream discharge during the operation. When the stream flow enters the water turbine machine from the inlet 15a at upstream segment 15 to the upstream flow path 15b having gradually converged cross-sectional area, due to the cross-sectional area of the discharging opening 15c close to the water turbine 2 gradually becoming narrow, the potential energy of the stream flow is sufficiently converted into kinetic energy, as well as due to the upstream flow-dividing plate 151 and extending discharging arc plate 152, the impact angle can be effectively and constantly maintained so as to generate high speed stream flow impacting and rotating the water turbine 2. The water turbine 2 is rotated to drive power generator coupled thereto for generating electric power. The large inlet area allowing the stream flow entering the water turbine 2 can increase the power output because the stream discharge is also increased. When the water turbine 2 is rotated, the water in the interior of the water turbine 2 is discharged through the gap between the adjacent blades 22. Accordingly, the discharged stream flow can generate reaction force on the water turbine 2 for pushing the water turbine 2 to rotate. The discharged stream flow from the water turbine 2 is guided to the downstream segment 16 of water-guiding base 1. The cross-sectional area of the downstream flow path 16b is apparently diverged so that the discharged stream flow from water turbine 2 can be rapidly exhausted to outlet 16a at downstream segment thereby increasing the discharge stream.

Figure 5:
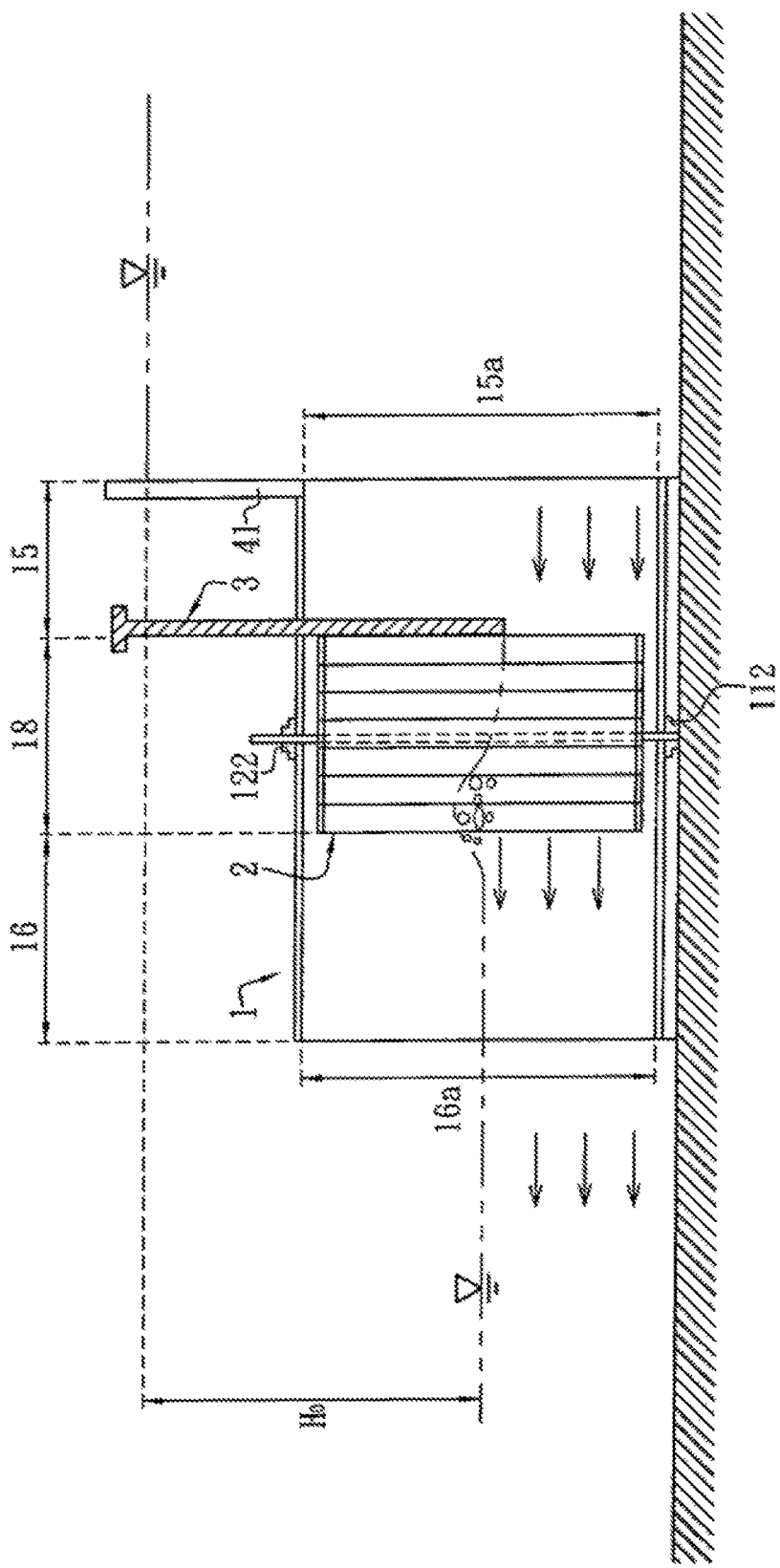
FIG. 5 illustrates a cross-sectional view of water-blocking plate arranged at upstream side of the water turbine machine according to one embodiment of the present invention.
Figure 6:
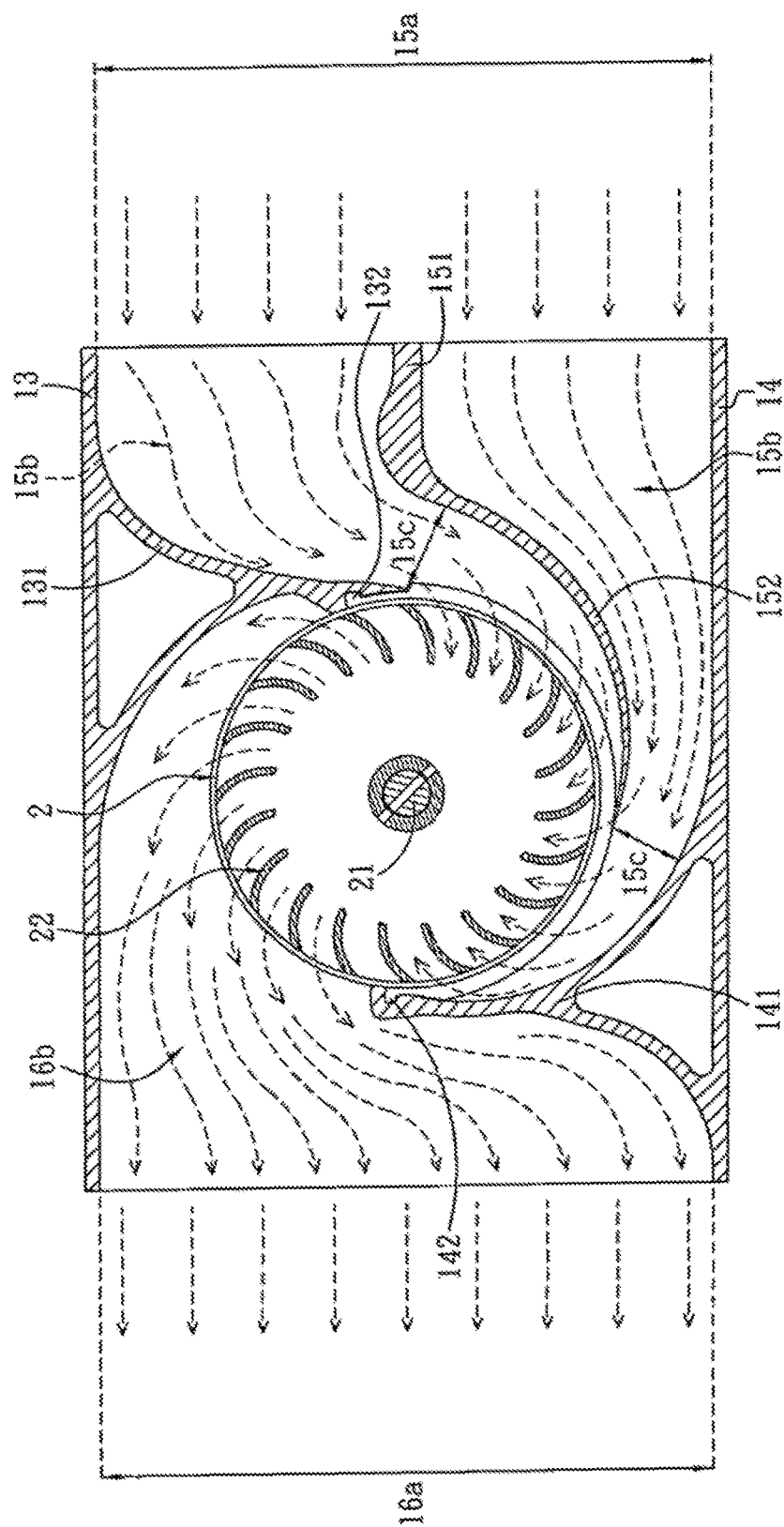
FIG. 6 illustrates flowing status of the stream flow and operation of the water turbine according to one embodiment of the present invention.

Please refer to FIG. 5, which is utilized for explaining the efficiency of the present invention. Assuming that the total water head is Ho, the effective water head after deducting the loss of water head is H, the acceleration of gravity is g, discharging coefficient of discharging opening 15c is C, and theoretical flow rate of cross-sectional area of the discharging opening 15c is V that can be represented as $V = C \times \sqrt{2 \times g \times H}$. In addition, if the total cross-sectional area combined with each discharging opening 15c and opening degree of the gate shell 3 is represented as A, the stream discharge Q is represented as $Q = V \times A = C \times A \times \sqrt{2 \times g \times H}$. Accordingly, the theoretical power output W is represented as $W = Q \times g \times H$. If the measured power output is represented as W', then the efficiency of water turbine machine can be represented as $e = W'/W$.

Figure 7:
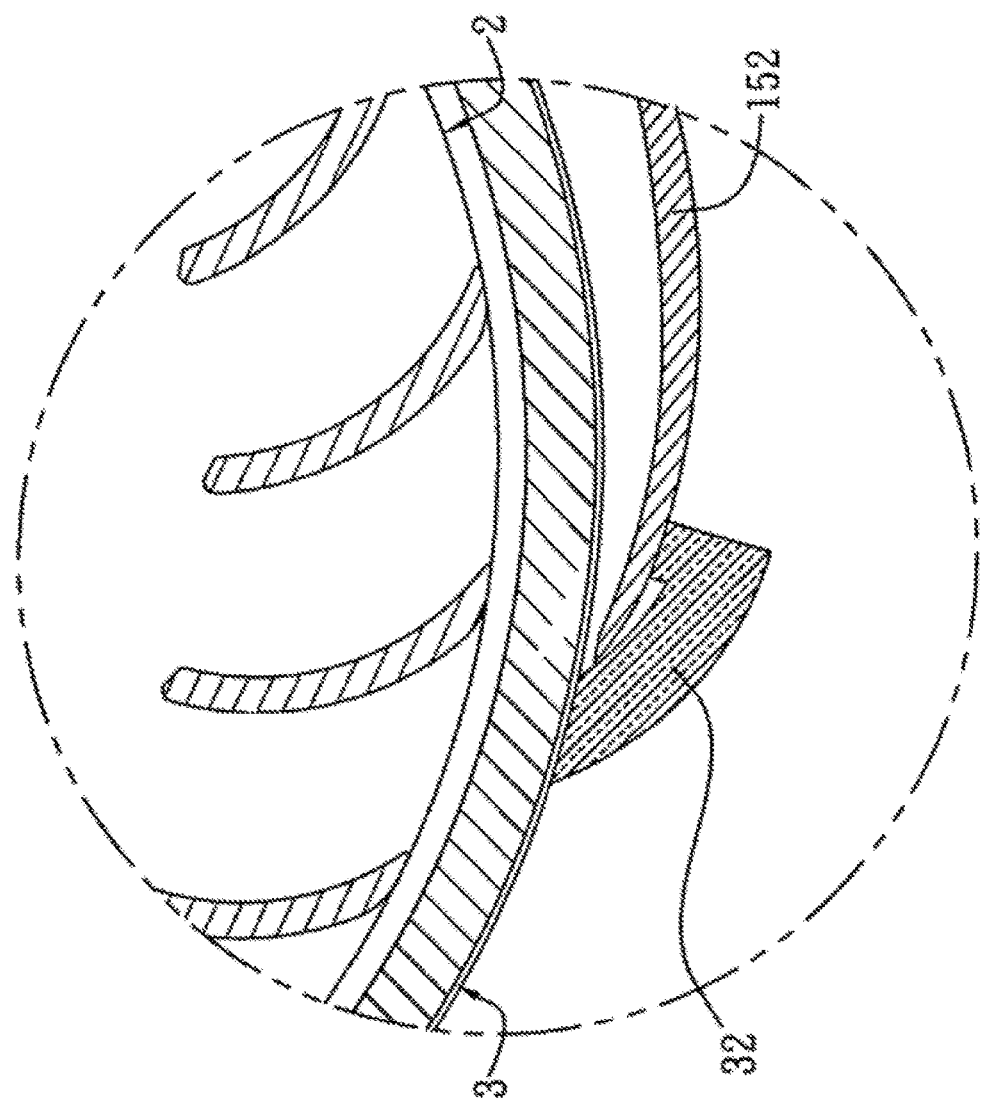
FIG. 7 illustrates a reinforcing bar arranged at the gate shell according to one embodiment of the present invention.

Please refer to FIG. 7, which illustrates a reinforcing bar 32 arranged at the gate shell according to one embodiment of the present invention. Comparing to the foregoing embodiment shown in FIGS. 1-6, the characteristic of the present embodiment is that a reinforcing bar 32 is arranged on the gate shell 3 for enhancing the positioning effect that the discharging arc plate 152 of the upstream flow-dividing plate 151 acts on the gate shell 3. When the stream flow passes through the gate shell 3, positioning effect and supporting force from the discharging arc plate 152 and reinforcing bar 32 can be received by gate shell 3 thereby preventing the gate shell 3 from being over deformed and generating vibration.

Figure 2:
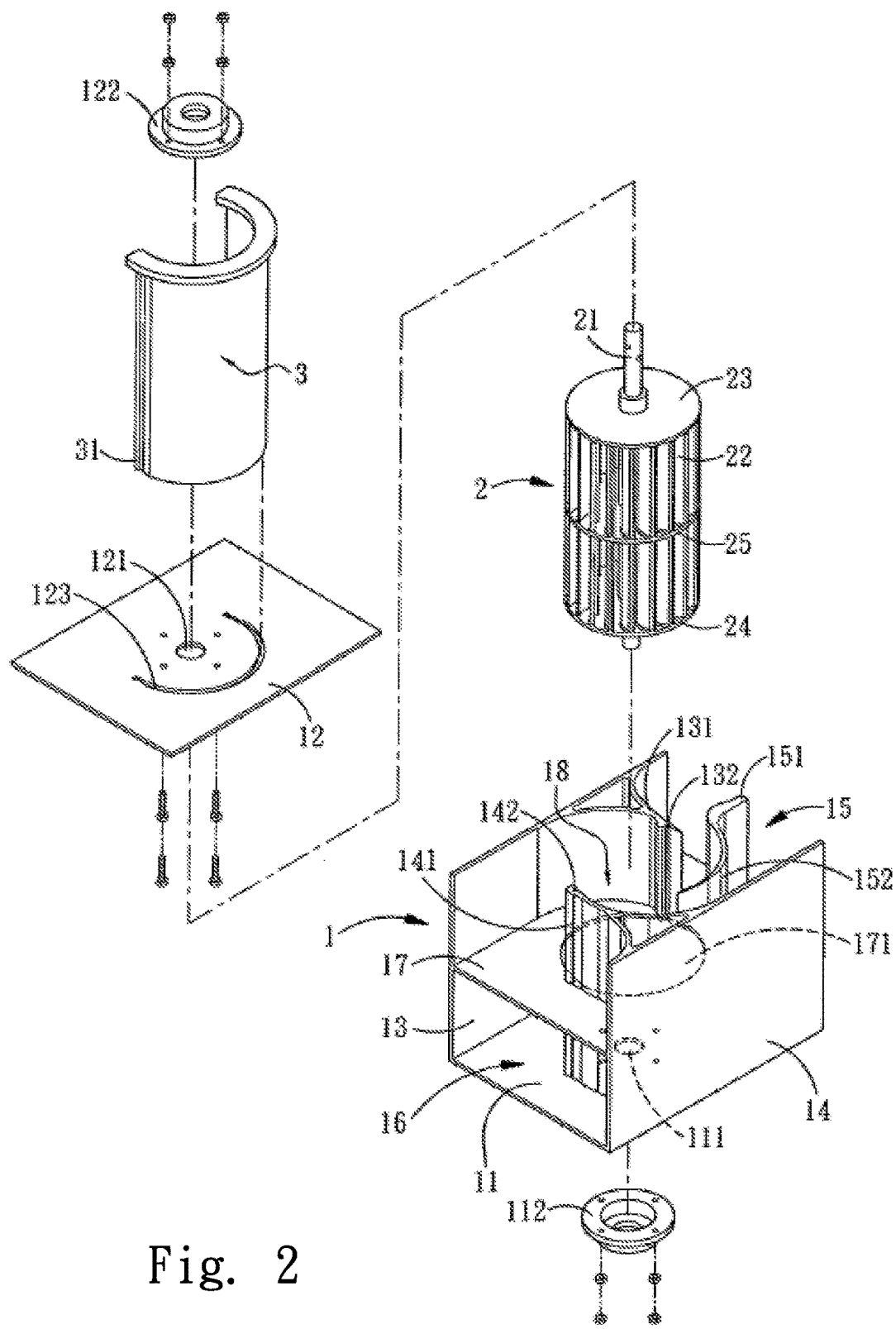
FIG. 2 illustrates an explosive view of water turbine machine according to one embodiment of the present invention.
Figure 3:
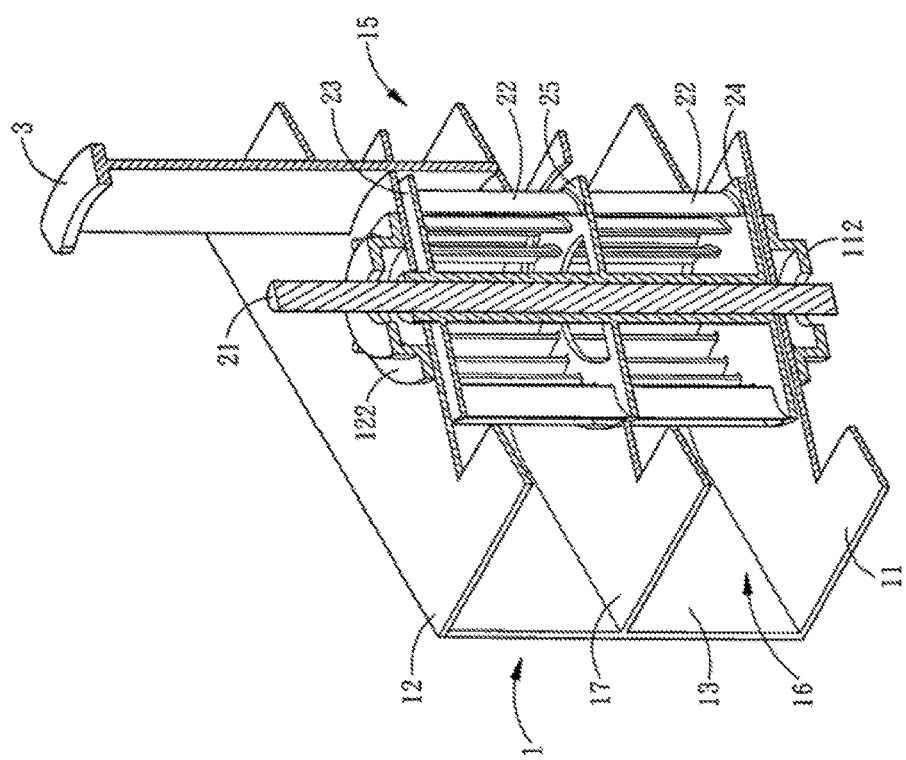
FIG. 3 illustrates a perspective cross-sectional view of the water turbine machine according to one embodiment of the present invention.
Figure 4:
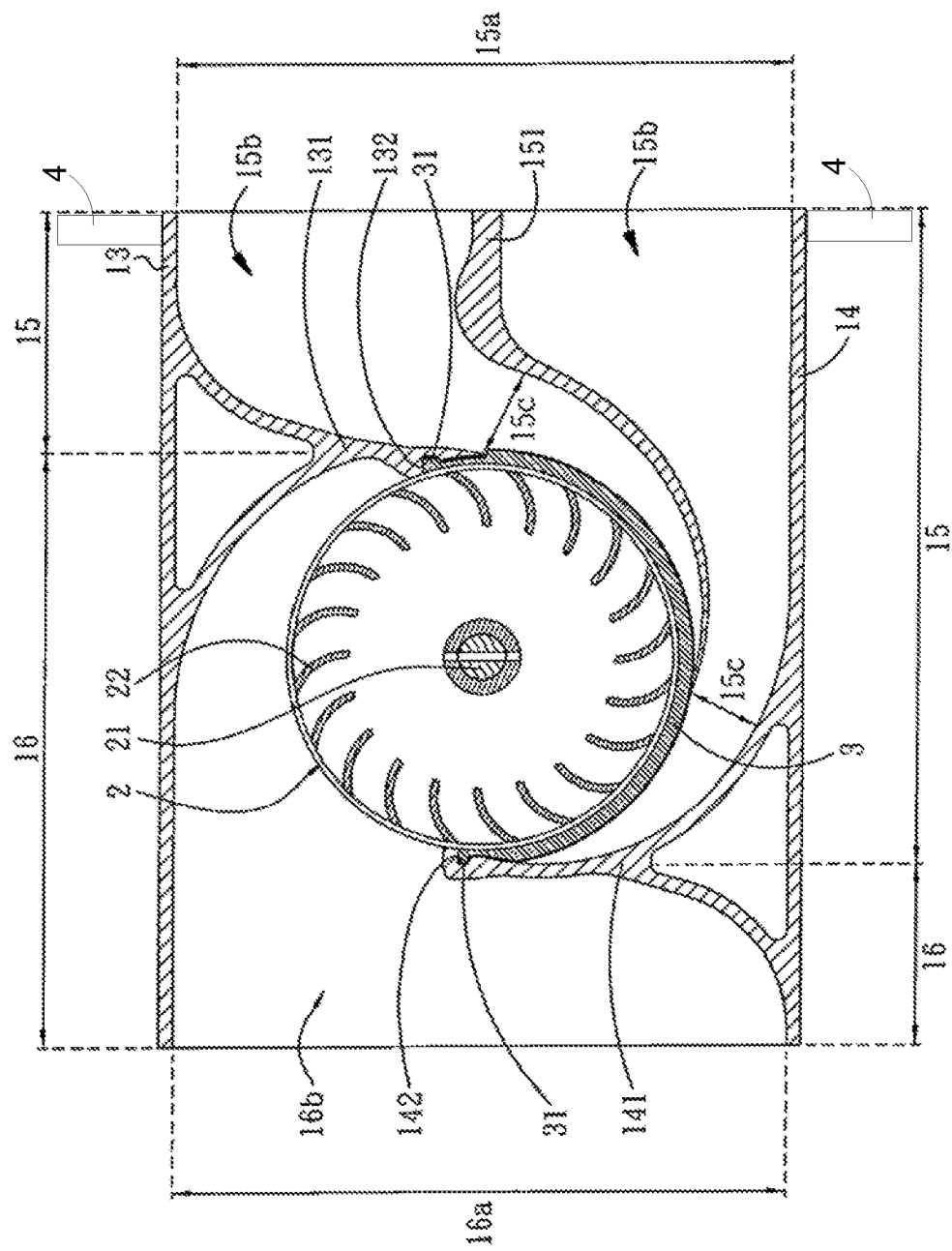
FIG. 4 illustrates top cross-sectional view of the water turbine machine according to one embodiment of the present invention.
Figure 8:
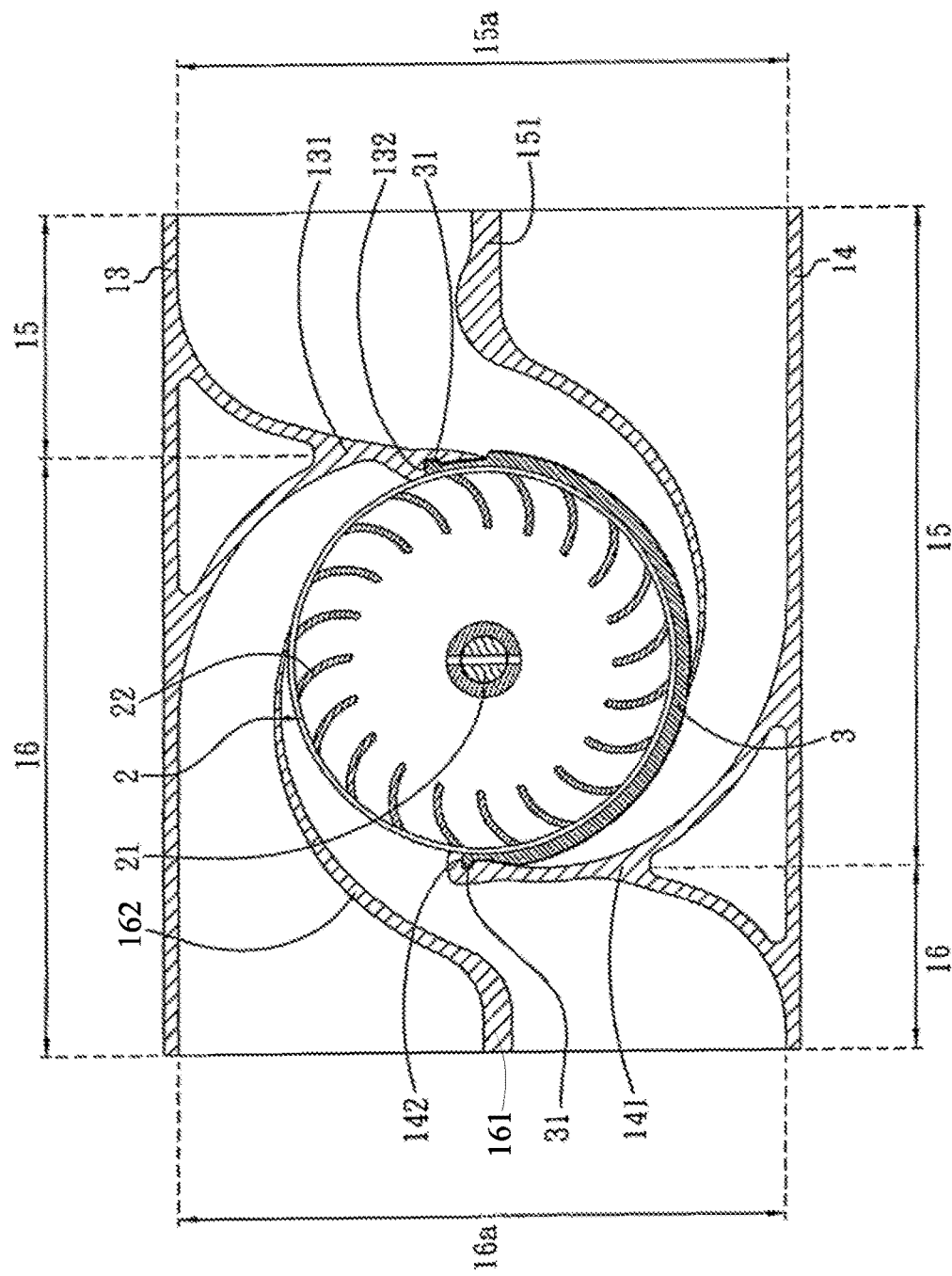
FIG. 8 illustrates a tidal operation of the water turbine machine according to one embodiment of the present invention.

Please refer to FIG. 8 and FIG. 2, which illustrate a tidal operation of the water turbine machine according to one embodiment of the present invention. Comparing to the previously described embodiment shown in FIGS. 1-6, the characteristic of the present embodiment is that the downstream segment 16 of the water-guiding base 1 further comprises a downstream flow-dividing plate 161 having a connecting arc plate 162 extending toward the upstream side. The downstream flow path 16b refers to a range formed by first lateral plate 13, the second water-guiding wall 141 and the second lateral wall 14 in the downstream segment 16 of the water-guiding base 1. When the discharged water from the water turbine 2 is guided to the downstream segment 16 of the water-guiding base 1, since the cross-sectional area is gradually expanded from the accommodating space 18 to the outlet 16a, the discharged water can be evenly distributed and smoothly expanded within the downstream flow path 16b.

The present embodiment can also be applied in the tidal power generation. Since the water level associated with the upstream side and downstream side will be exchanged with respect to the high tide time and low tide time, the inlet and outlet of the water turbine machine will be exchanged as well such that the structure associated with the upstream and downstream structure of water-guiding base 1 will be reversed according to the center of the water turbine 2. It is noted that when the upstream flow-dividing plate 151 is arranged in the upstream segment 15 and the downstream flow-dividing plate 161 is arrange din the down stream segment 16, the quantities of the upstream and downstream flow-dividing plates 151 and 161 are decided according to the actual stream flow status. Although the embodiment shown in FIG. 8 is explained by single upstream flow-dividing plate 151 and single downstream flow-dividing plate 161, it is not limited to the quantities shown therein.

Figure 9:
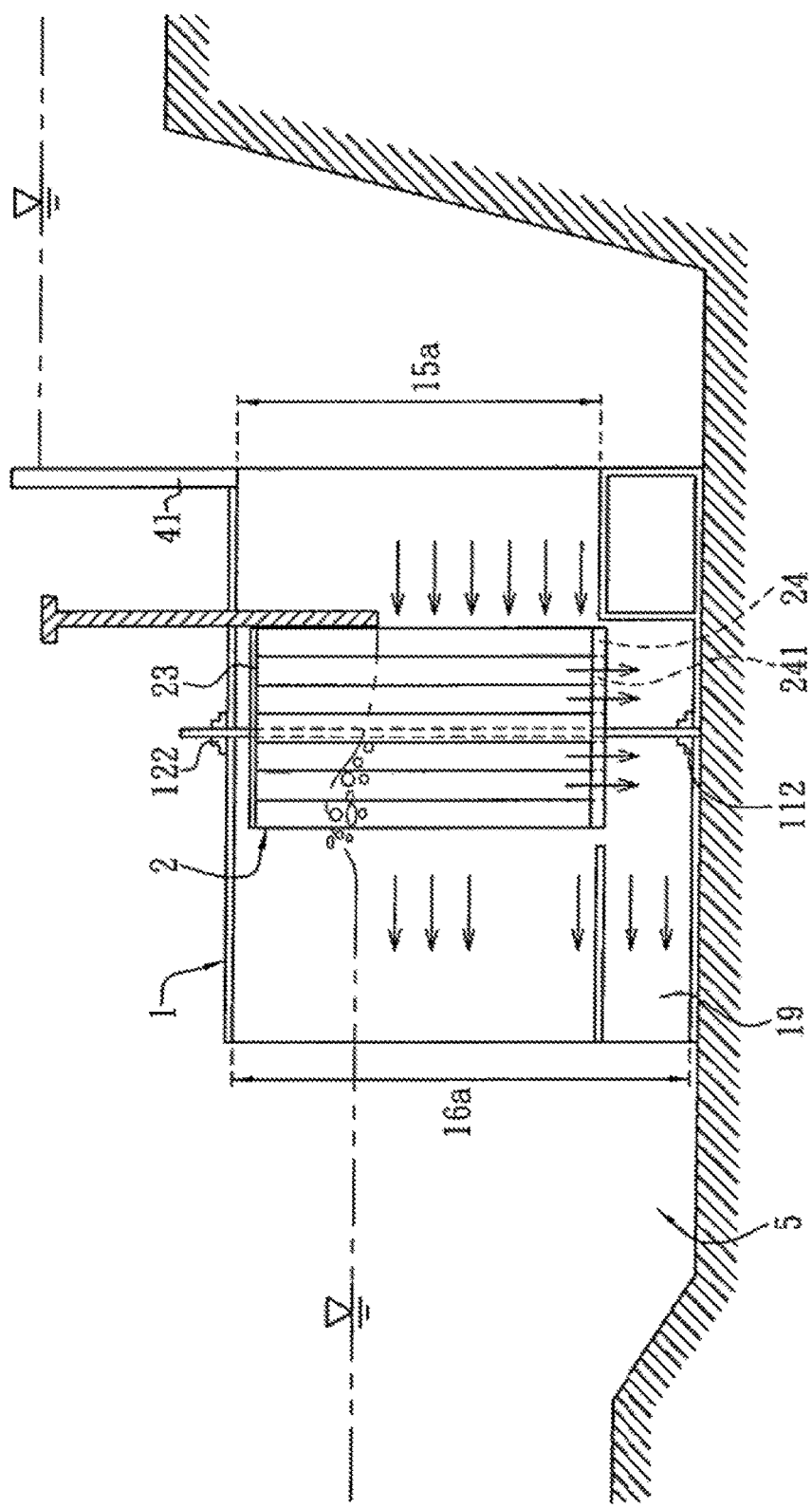
FIG. 9 illustrates the water turbine machine operated under condition having damping tank according to one embodiment of the present invention.

Please refer FIG. 9, which illustrates the water turbine machine operated under condition having damping tank according to one embodiment of the present invention. In the present embodiment, the water turbine machine of the present invention is arranged in the environment having elevation difference and damping tank wherein the water-blocking plate 4 is arranged in the upstream segment 15, and damping tank 5 lower than the riverbed or bottom of canal is formed by excavating the downstream side of the area having elevation difference. Since the bottom side of the water turbine 2 is generally arranged on the riverbed or bottom of canal, the space of damping tank 5 can be utilized to exhaust the water flow coming from the water turbine 2. In one embodiment, the second plate 24 further comprises through-hole type or fan type drain opening 241 while a bottom water-discharging space 19 for discharging water, such as drain tank, and elevated space, for example, can be arranged under the bottom of water-guiding base 1 whereby the water flow in the water turbine 2 can be exhausted to the bottom water-exhausting space 19 through the drain opening 241 and then be exhausted to the downstream side of outlet 16a thereby enhancing the water-exhausting amount and operation efficiency.

Figure 10:
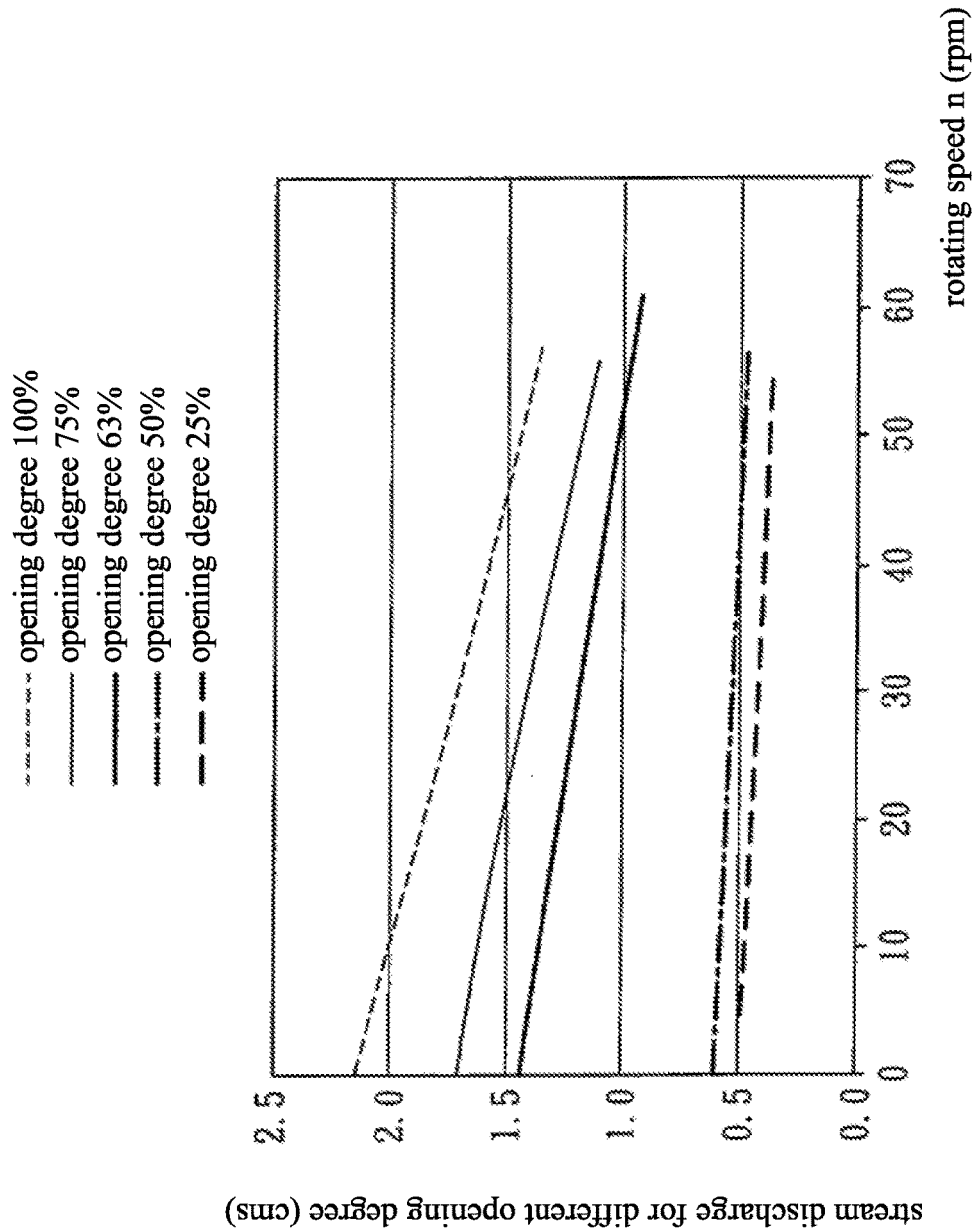
FIG. 10 illustrates an experimental data with respect to the water turbine machine of the present invention operated under low-head and high flow condition.

Please refer to FIG. 10, which illustrates an experimental data with respect to the water turbine machine of the present invention operated under low-head and high flow condition. That is, under the condition that unit diameter 1M and unit water head 1M, the capability for processing the stream discharge with respect to various opening degree of the gate shell is shown in FIG. 10. In the condition that the gate shell is completely opened and rotation speed of water turbine is 30 rpm, the stream discharge of affordable capability is 1.7 CMS which clearly shows that the water turbine machine of the present invention has capability for processing high stream discharge under low-head condition and the capability for processing high stream discharge is superior to the conventional penstock water turbine machine; therefore, the water turbine machine of the present invention can be arranged directly in the river and canal. Although the efficiency is inferior to the conventional penstock water turbine machine, the structure is simplified and construction facility is much reduced. Accordingly, under low-head and high flow condition, the cost is greatly saved than the conventional penstock water turbine machine such that, in viewpoint of economic, it is better than the conventional water turbine machine.

Figure 11:
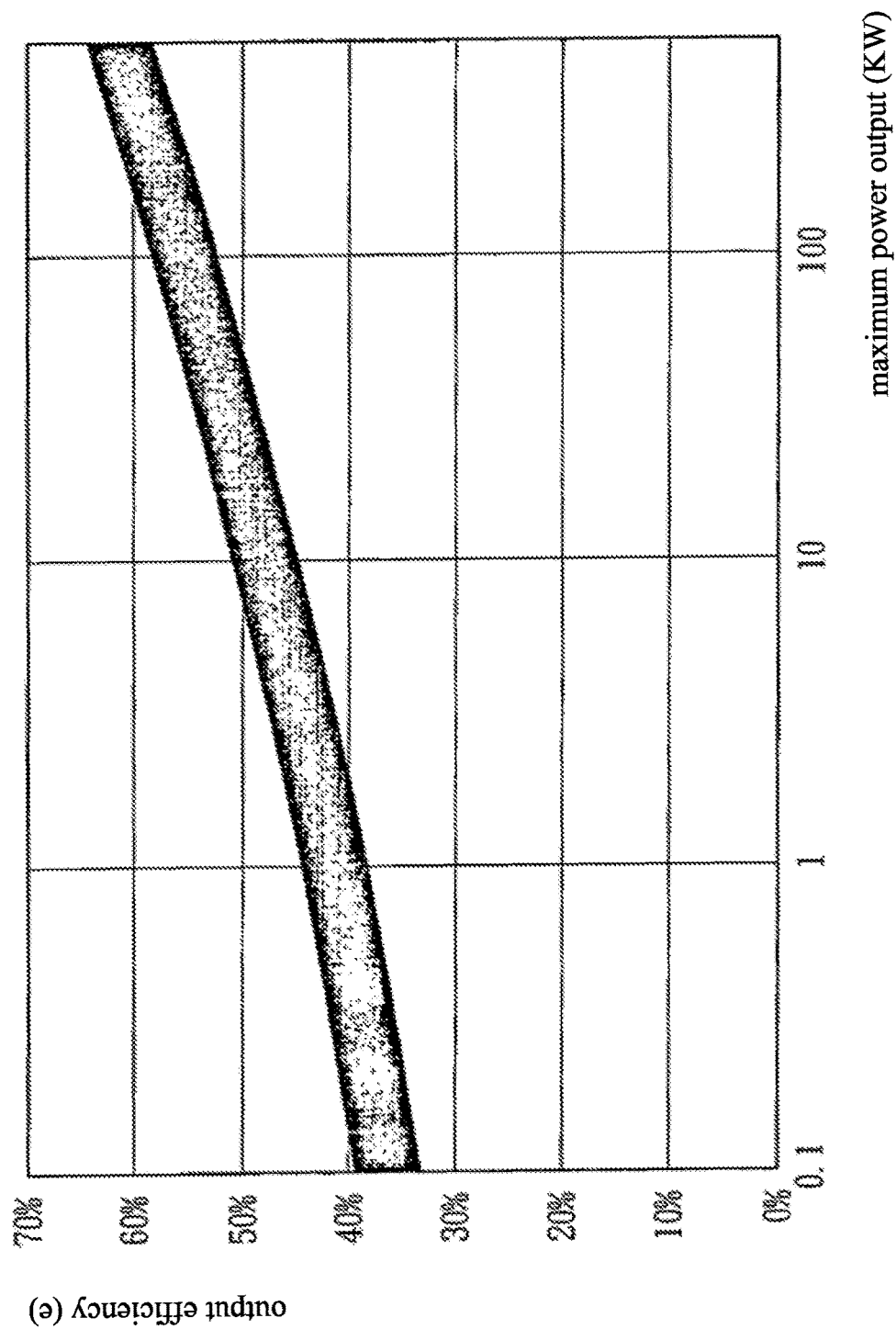
FIG. 11 illustrates experimental data of operation efficiency with respect to power output of water turbine machine of the present invention having different kind of dimension.

Please refer to the FIG. 11, which illustrates experimental data of operation efficiency with respect to power output of water turbine machine having different size ranging from small dimension to large dimension. In the present experiment, although the operation efficiency associated with various kinds of dimension, from small to large, of water turbine machine with different output capability according to the present invention is ranged between 0.4~0.6, which is inferior to the conventional penstock water turbine machine, the result is better than other conventional low-head and high flow water turbine machine that can be directly arranged in the river and canal.

Figure 12:
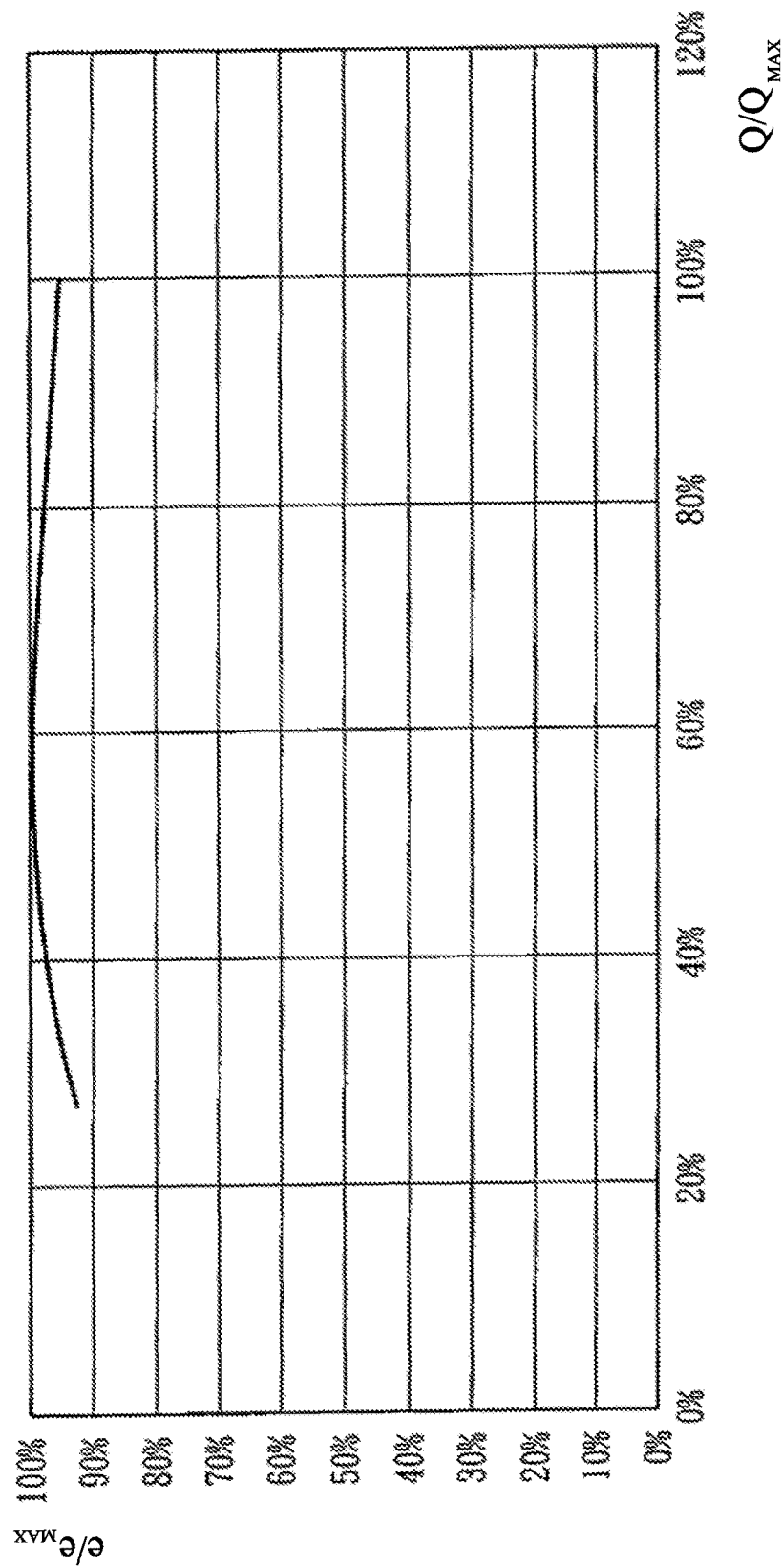
FIG. 12 illustrates experimental data that proves the water turbine machine of the present invention can be high efficiently operated under variation of stream discharge.

Please refer to FIG. 12, which illustrates experimental data that proves the water turbine machine of the present invention can be high efficiently operated under variation of stream discharge. In the present experiment, it proves that even if the maximum affordable stream discharge is 25% for a single water turbine machine that is operated under great variation of stream discharge, the water turbine machine of the present invention can be operated in high efficiency area so that it can be adapted in the river or canal having great variation of stream discharge with respect to the different seasons.

According to the above-described embodiments, the present invention actually possesses the following merits:

1. The discharging opening 15c is formed in the upstream segment whereby the potential energy of the water can be completely converted into kinetic energy thereby forming a high speed water stream for impacting one side of the water turbine 2 and the water stream in the water turbine 2 is exhausted from another side of water turbine 2 thereby forming reaction force acting on the water turbine 2, wherein the impacting force and reaction force are combined to efficiently rotate the water turbine 2 so that the power generator coupled to the water turbine 2 can be driven to generate electric power.

2. The cross-sectional area of the downstream flow path 16b in the downstream segment 16 is gradually expanding from the upstream side to the downstream side. The outlet 16a has widest cross-sectional area so that the exhausted water can be evenly distributed and smoothly expanded within the downstream flow path 16b and flows to the downstream part of canal or river.

3. The gate opening degree of the gate shell 3 can be adjusted through reciprocating movement so as to control cross-sectional area of discharging opening 15c thereby controlling the stream discharge of water and keeping the upstream water level maintaining high so that the operation of water turbine machine can be maintained stable and high operation efficiency under different flow condition. Since the water turbine machine of the present invention has high adaptability as well as high ratio of utilization, it can be adapted in the environment having great variation of stream discharge with respect to the different seasons. In addition, the water turbine machine of the present invention has characteristics of simplified structure, easy installation and operation so that it can be installed directly in the river or canal.

While the present invention has been particularly shown and described with reference to a preferred embodiment, it will be understood by those skilled in the art that various changes in form and detail may be without departing from the spirit and scope of the present invention.

What is claimed is:

1. A low-head and high flow water turbine machine, comprising:

a water-guiding base, configured to have a hollow cylindrical-shaped accommodating space formed therein, wherein the hollow cylindrical-shaped accommodating space has an upstream segment with an inlet at a upstream side and a downstream segment with an outlet at a downstream side, the water-guiding base further comprising a bottom plate, a first and a second lateral plates respectively coupled to two opposite sides of the bottom plate, and a top plate arranged on the first and second lateral plates, the first and the second lateral plates respectively having a first and a second water-guiding walls, each of which has a tapered tower shape, respectively protruded from the first and the second lateral plates to a circumference of the hollow cylindrical-shaped accommodating space, wherein a first and a second guiding slots are respectively arranged at an end of the first and the second water-guiding walls, and the first and the second water-guiding walls are respectively misaligned and arranged anti-symmetrically to a central axis of the hollow cylindrical-shaped accommodating space such that the upstream segment is formed as a smoothly converged flow channel while the downstream segment is formed as a smoothly diverged flow channel;

a water turbine, arranged in the hollow cylindrical-shaped accommodating space of the water-guiding base, the water turbine further comprising a rotating shaft and a plurality of blades, wherein two ends of the rotating shaft respectively pass through an axle hole formed on the bottom plate and top plate and are respectively connected to the bottom plate and the top plate corresponding to the hollow cylindrical-shaped accommodating space through a bearing; and a cylindrical-shaped gate shell, configured to pass through the top plate and slidably coupled to a circumference of the water turbine around the upstream side, wherein the two lateral sides of the cylindrical-shaped gate shell respectively slidably coupled to the first and the second guiding slots whereby an opening degree of the cylindrical-shaped gate shell can be adjusted through sliding the cylindrical-shaped gate shell for adjusting a cross-sectional area of a stream flow so as to control a stream discharge of the water turbine, switching off operation of the water turbine, and adjusting a water level at the upstream side to be at a high water level state.

2. The water turbine machine of claim 1, wherein the upstream segment of the water-guiding base further comprises at least one upstream flow-dividing plate having an discharging arc plate extending toward the hollow cylindrical-shaped accommodating space such that the upstream segment is divided into a plurality of smoothly converged sub-channels respectively having an discharging opening toward to one side of the hollow cylindrical-shaped accommodating space through which the stream flow from the upstream side stably and smoothly impacts the water turbine with small tangential angel and high flow speed.

3. The water turbine machine of claim 1, wherein the downstream segment further comprises at least one downstream flow-dividing plate having a connecting arc plate extending toward the hollow cylindrical-shaped accommodating space such that stream flow exhausted from the water turbine is expanded and flows to the outlet stably and smoothly.

4. The water turbine machine of claim 1, wherein the top plate is separable or partially separable from the first and the second lateral plates so as to facilitate installing the water turbine, and an arc slot is formed on the top plate for allowing the cylindrical-shaped gate shell sliding and passing therethrough.

5. The water turbine machine of claim 1, wherein a reinforcing bar is arranged on a surface of the cylindrical-shaped gate shell whereby the gate cylindrical-shaped shell is positioned and supported such that an acting force that an end of the discharging arc plate of the upstream flow-dividing plate acts on the gate shell is reinforced.

6. The water turbine machine of claim 1, wherein the cylindrical-shaped gate shell is further coupled to a driving mechanism that is utilized to drive the cylindrical-shaped gate shell to generate a reciprocating movement.

7. The water turbine machine of claim 1, wherein the water turbine is further coupled to an accelerator, a power generator, or a transmission mechanism so that the accelerator, the power generator, or the transmission mechanism receives energy from the water turbine.

8. The water turbine machine of claim 1, where at least one separating plate is arranged between the top plate and the bottom plate of the water-guiding base, and each separating plate further comprises a circular hole corresponding to the hollow cylindrical-shaped accommodating space for allowing the water turbine and cylindrical-shaped gate shell passing therethrough.

9. The water turbine machine of claim 1, wherein a water-blocking plate or a lifting plate is arranged at the upstream side of the water-guiding base for blocking a cross-sectional area of the stream flow and, in response to control of the cylindrical-shaped gate shell, the stream flow from the upstream side is impounded so as to form high water level state thereby increasing energy of the stream flow from the upstream side.

10. The water turbine machine of claim 1, wherein the water turbine further comprises a first plate, and a second plate, and the plurality of blades are circumferentially arranged between the first plate and the second plate, wherein at least one dividing plate is arranged between the first plate and the second plate.

11. The water turbine machine of claim 10, wherein a through hole is formed on the dividing plate for allowing the stream flow to pass through the dividing plate and flowing in dividing space defined by the first plate, the second plate and the at least one dividing plate.

12. The water turbine machine of claim 10, wherein the second plate further comprises at least one drain opening, and a discharging room is arranged under a bottom side of the water-guiding base so that the stream flow entering the water turbine flows downward to the discharging room through the at least one drain opening, and is exhausted from the outlet.

13. The water turbine machine of claim 1, wherein the water turbine is a vertical-axis type water turbine.

14. The water turbine machine of the claim 1, wherein a rotation direction of the water turbine is clockwise rotation or counterclockwise rotation.

* * * * *